United States Patent Office 3,527,413
Patented Sept. 8, 1970

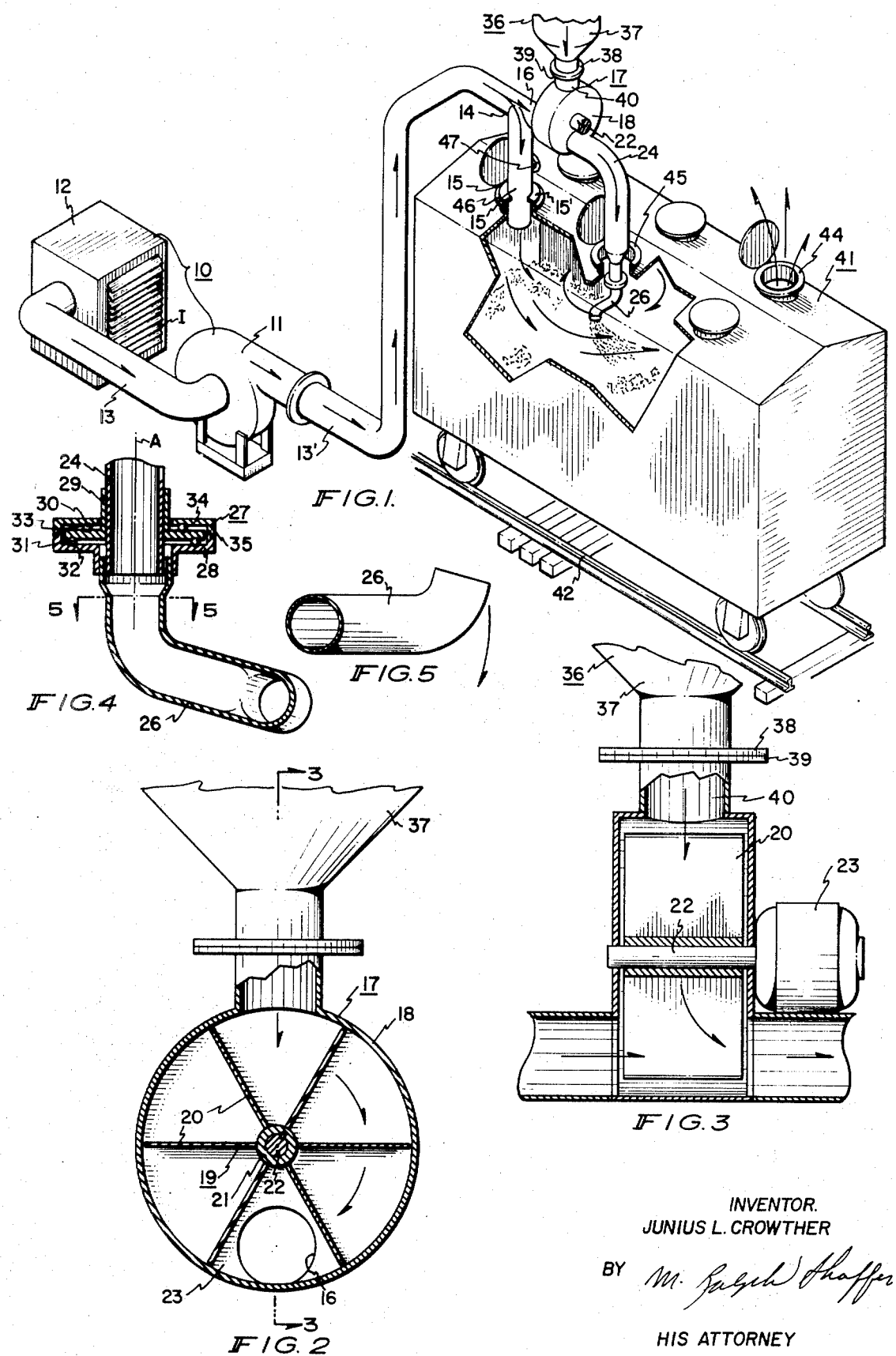

3,527,413
PROCESS FOR LOADING FLOUR INTO CONTAINERS
Junius L. Crowther, 460 Mill St., Malad, Idaho 83252
Filed Jan. 22, 1968, Ser. No. 699,610
Int. Cl. B02b 3/14, 7/02; B02c 11/08
U.S. Cl. 241—12                                7 Claims

ABSTRACT OF THE DISCLOSURE

Process of loading flour into containers such as storage bins, for example, or even into freight vehicles, such as railroad freight cars, in such a manner as to preclude the formation of flaking or crust, and the sticking of flour onto the inner wall of the container as results through moisture condensation therewithin. This is done by using one and preferably two incoming streams of air within the container, the air being pre-cooled and/or dehumidified, preferably both. In the latter case, especially, the flour is cooled and moisture is substantially reduced if not eliminated. In this way condensate will not tend to form on the inner walls of the loaded container, which condensate would otherwise cause undesired flaking, crust formation, or sticking of the flour at the wall surfaces of the containers.

---

The present invention relates to processes for loading flour into containers and, more particularly, to a new and improved process of loading flour in containers, or into vehicles such as freight cars preparatory to transit.

While the present invention is described in terms of freight vehicles, it will be understood that the invention applies with equal validity to all types of containers, moveable or stationary, and wherever situated.

In the past a number of systems have been devised for loading flour produced at flour mills into freight cars in a continuous operation. More and more the tendency in the industry has been to load cars in bulk rather than milling, sacking, and then depositing the sacks in the cars. When loading cars in bulk there are a number of problems present. In the first place it is to be understood that it is highly desirous that the loading process be performed at the time of milling and in a continuous process. Grains such as wheat is stored in kernel form and does contain moisture. The present federal standards allows a permissible grain moisture content of 13½ percent. Moisture present in the grain kernels is necessary to obtain a proper milling of the same, as well as for other commercial reason.

When a customer orders a bulk flour shipment, the grain mill operator will obtain the necessary grain lot from storage and route the same through the mill. To simplify the operation, the output of the mill is immediately channeled into a mixing chamber at which point the milled flour is mixed with an incoming air stream for routing, as a flour-air fluid mixture, through certain conduit into the car to be loaded. The problem in the past has been that this air which is used is not pre-conditioned as to temperature and humidity.

The problems are manifold in this type of loading since the grain in the milling process becomes heated. Additionally, approximately 13% moisture content of the flour will cause the flour to flake and crust upon the interior walls of the loading car. This is because the warm flour coming into the car comes in intimate contact with the interior surfaces of the walls of the car which are cold. The moisture in the flour immediately condenses on the walls and causes the flour to stick to the walls. It is noted that this results not only from the temperature of the flour but also from the inherent moisture content thereof, and for a variety of reasons it is not practical to de-moisturize the flour before loading. This would require a separate and rather expensive process.

Accordingly, the principal object of the present invention is to provide a method of depositing flour into loading vehicles such as railroad cars wherein moisture condensation within the car is substantially eliminated.

A further object of the invention is to provide a method for loading flour in freight vehicles wherein preconditioned air is used to itself condition the flour as it falls into the freight vehicle so that moisture and/or heat, and preferably both, are measurably reduced.

A further object is to provide a process for loading flour into freight vehicles wherein the flour is carried by a pre-conditioned air into the freight vehicle, the air being pre-cooled and preferably de-moisturized so as to be able to receive and take away both moisture and excess heat from the flour as it is actually being deposited into the vehicle.

An additional object is to provide an improved loading process for loading flour in freight vehicles wherein a separate circulating stream of pre-conditioned air is passed through flour being dropped into the freight car so as to take away heat and/or moisture, and preferably both, from the car, thereby precluding condensation from forming on the inner walls of the car.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a fragmentary perspective view of a freight loading system incorporating the process of loading in the present invention.

FIG. 2 is an enlarged front view of a mixing chamber incorporated in the present invention wherein the front plate is removed, the mixing chamber is used to accomplish the entrainment of flour dropping therethrough into the air stream directed into the freight vehicle.

FIG. 3 is a fragmentary section taken along line 3—3 in FIG. 2.

FIG. 4 is a front elevation, principally in section, of the lower portion of the inlet feed chute seen in FIG. 1.

FIG. 5 is a fragmentary view of the feed chute of FIG. 4 when rotated in a different direction.

In FIG. 1 air conditioning unit 10 includes a volume blower 11 which is connected to conditioning unit 12 by a large duct 13. The air conditioning units are well known in the art and may take any one of several different designs. The conditioning unit 12 preferably both cools and de-humidifies the incoming air at I. Of course, if desired, the conditioning unit 12 may either lower the temperature parameter or lower the moisture content of the incoming air relative to the surrounding atmosphere. Both parameters, however, should be materially reduced, say by at least an amount equal to ten percent and preferably more.

The so-processed air is carried by duct 13' to junction 14 leading to circulating duct 15 and also primary duct 16. The latter is directly connected to mixing chamber 17. Mixing chamber 17 may take a form as shown in FIG. 2, having an exterior housing 18 and a central, feed wheel 19 provided with radial blades 20 connecting to hub 21. A central shaft 22 forms the shaft of motor 23, see FIG. 3, and the hub 21 is keyed thereto by any suitable means. Motor 23 is a low-speed, variable-speed motor by which the operator can vary the rotation of feed wheel 19 and radial fins 20 and, hence, the feed of flour introduced therein to a lowermost portion 23 of the mixing chamber.

Outlet conduit 24 is a fixed or otherwise attached to the chamber 18, is preferably a flexible conduit, and includes an end discharge chute 26. Discharge chute 26 is rotatively connected to conduit 24 by means of a split-bearing housing 27 the lower half 28 of which is rigidly secured to chute 26. Flange 29 is affixed to conduit 24 and includes suitable bearings 30 and 31 to enable the rotatable disposition of discharge chute 26 about axis A. Suitable grooved races at 32 and 33 may be provided the flange 29. Upper half 34 of bearing housing 27 is threaded at 35 onto the lower half of the bearing. FIG. 5 illustrates a re-orientation of chute 27, this through the accommodation of the bearing means 27.

A mill 36, suitable for milling wheat flour, for example, is provided and includes a hopper 37; the latter is provided with flange 38 which is connected by any suitable means to flange 39 of chamber inlet 40.

A container or other loading vehicle such as freight car 41 is disposed on siding tracks 42 and, as seen, is in the process of loading. Three port covers are removed to uncover the openings 44, 45, and 46. Disposed through opening 45 is a conduit 24 including discharge chute 26. Disposed through opening 46 is conduit 15 having sealing flange 15'; conduit 15 preferably includes an air flow regulator valve 47, this for regulating flow of circulating air hereinafter described.

In operation, grain is fed into mill 36 which converts the same to flour leading into hopper 37. The flour is gradually introduced by motor-driven feed-wheel 19 into the lower region 23 of chamber 17. It is at this point that pre-conditioned air picks up the flour and carries it through entrainment as a flour-air mixture, this for deposit of the flour through conduit 24 and chute 26 into the car 41. Again, at least one of the moisture and temperature parameters, preferably both, of the incoming air is lowered at unit 12. Likewise, and preferably, there is separately introduced into the car a circulating air stream through conduit 15, as may be regulated by valve 47, this for blowing pre-conditioned air through the flour as it is deposited into the car. Air from both sources is exhausted through port 44.

In the operation, the incoming stream of air through conduits 13', 16 and 24 carries the flour into the car and, further, cools the flour and carries away moisture from the flour as the flour is dropped from its entrainment within the air stream entering the car. Additionally, as the flour falls into the car the secondary source of pre-conditioned air, coming through conduit 15, is allowed to circulate through the car, through the downcoming stream of flour, so as to further cool the same and lower the temperature of the flour. Accordingly, the flour when deposited into the car is substantially cooled and de-moisturized, thereby precluding the condensation of moisture, within the vehicle or car, at the interior walls thereof; such would otherwise tend to produce a crust, flaking, or sticking of the flour at or to the cold interior walls of the car.

At least one of the moisture-temperature parameters is to be lowered relative to the surrounding atmosphere, and this whether one or both air streams are used. Conceivably, of course, but one air stream may be supplied for conducting the flour into the car as well as cooling and or de-moisturizing the same. It is much preferred, however, that both air streams be used so that a thorough cooling and or de-moisturization takes place. The transverse air condition as above described has proven highly effective.

The structure above described and set forth in the accompanying drawing indicates a manner in which the method is practiced.

The method or process may be summarized as one of loading a vehicle with flour which comprises the steps of milling flour from a desired grain; providing a constrained stream of air having moisture-content and temperature parameters at least one of which is lower than a corresponding character of the surrounding atmosphere, the stream of air being directed into a vehicle to be loaded; and introducing said flour within such stream of air, for transport thereby as an air-flour fluid into the vehicle.

The step of providing a constrained stream of air may be further delimited by having either a moisture reduction, a temperature reduction, or both relative to the surrounding atmosphere.

A preferred method supplies the additional step of providing an additional and separate air stream, conceivably from the same source, but which is blown into the vehicle through a separate port and directly through the flour as it is being deposited into the vehicle. Again, at least one and preferably both parameters (moisture-content and temperature) are substantially lower relative to the surrounding atmosphere. In this way the flour is cooled and all excess moisture is taken out of the car, this so as to preclude condensation of moisture onto the inner walls of the car or other vehicle receiving the flour. Finally, the cooling of the flour precludes any moisture already in the air within the car from condensing onto the walls of the car.

In summary, the present invention presents a method of depositing flour into a freight car or other vehicle wherein such is accomplished in such a manner as to preclude the crust or flake formation within the car as would otherwise result through condensation of the moisture therewithin. This process is carried out as above described by the employment of de-humidified and/or temperature-lowered air, either for simply introducing flour into the car or, and preferably, for introducing flour into the car as a flour-air fluid and simultaneously blowing circulating air through the incoming flour so as to carry away additional moisture and heat from the flour and general car interior.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. The process of filling a container enclosure with flour, said process comprising the steps of: milling flour from grain; providing a stream of air having moisture content and temperature parameters at least one of which is lower than the corresponding character of the surrounding atmosphere, said stream of air being directed through said container enclosure to be filled; and passing said flour through said stream of air to fill said container enclosure.

2. The process of claim 1 wherein the step of providing a constrained stream of air comprises providing a constrained stream of air having a moisture content which is lower than that of the surrounding atmosphere.

3. The process of claim 1 wherein the step of providing a constrained stream of air comprises providing a constrained stream of air having a temperature which is lower than that of the surrounding atmosphere.

4. The process of claim 1 wherein the step of providing a constrained stream of air comprises providing a constrained stream of air having temperature and moisture content parameters which are both lower than the corresponding characteristics of said atmosphere.

5. The process of claim 1 wherein the step of passing said flour comprises passing said flour laterally through said stream of air to fill said container enclosure.

6. The process of claim 1 wherein the step of passing said flour comprises pneumatically introducing said flour within said container enclosure, through said stream of air passing there-through.

7. The process of claim 6 wherein there is provided the additional step of separating a portion of said stream of air for accomplishing the pneumatic conveyance of flour into said container enclosure.

References Cited

UNITED STATES PATENTS

| | | | |
|---|---|---|---|
| 1,381,266 | 6/1921 | Andrews | 241—12 |
| 1,424,608 | 8/1922 | Woolcott | 241—12 |
| 1,687,300 | 10/1928 | Loizillon | 241—12 X |
| 2,689,688 | 9/1954 | Ball | 241—12 |
| 2,770,543 | 11/1956 | Arnold | 99—2 |

ROBERT C. RIORDON, Primary Examiner

D. G. KELLY, Assistant Examiner

U.S. Cl. X.R.

141—67, 85; 241—16